United States Patent [19]

Asari et al.

[11] Patent Number: 4,755,119

[45] Date of Patent: Jul. 5, 1988

[54] MULTIPLE-CONTAINER TYPE COLD ISOSTATIC PRESS

[75] Inventors: Akira Asari, Nishinomiya; Yoshikazu Kishi, Motoyamaminami, both of Japan

[73] Assignee: Kabushiki Kaisha Kobe Seiko Sho, Kobe, Japan

[21] Appl. No.: 29,999

[22] Filed: Mar. 26, 1987

[51] Int. Cl.[4] .......... B29C 3/00

[52] U.S. Cl. .......... 425/78; 425/405.2; 425/DIG. 201; 419/49

[58] Field of Search .......... 419/42, 49; 425/77, 425/78, 405 H, DIG. 200, DIG. 201

[56] References Cited

U.S. PATENT DOCUMENTS 3,587,136 6/1971 Hermes .......... 425/78
3,761,574 9/1973 Rietmann .......... 425/405 H
3,772,009 11/1973 Isaksson .......... 419/49 X
3,820,934 6/1974 Stigler .......... 425/405 H
4,460,326 7/1984 Croseck et al. .......... 425/78 X
4,689,008 8/1987 Hailey .......... 419/49 X

FOREIGN PATENT DOCUMENTS 5441750 12/1979 Japan .

*Primary Examiner*—Charles Hart
*Attorney, Agent, or Firm*—Oblon, Fisher, Spivak, McClelland & Maier

[57] ABSTRACT

A cold isostatic press of the multiple container type including a press frame and an upper plug movable toward and away from a plurality of shaping containers and adapted to perform an operation of loading or unloading a first shaping material from a container and a pressure-forming operation on a second container concurrently at different positions, characterized in that the cold isostatic press includes a plurality of stationary shaping containers securely mounted on a fixed container frame. The press frame is supported linearly reciprocably or swingably for movement to and from a plurality of containers on the fixed container frame.

3 Claims, 7 Drawing Sheets

FIGURE 1 (II)
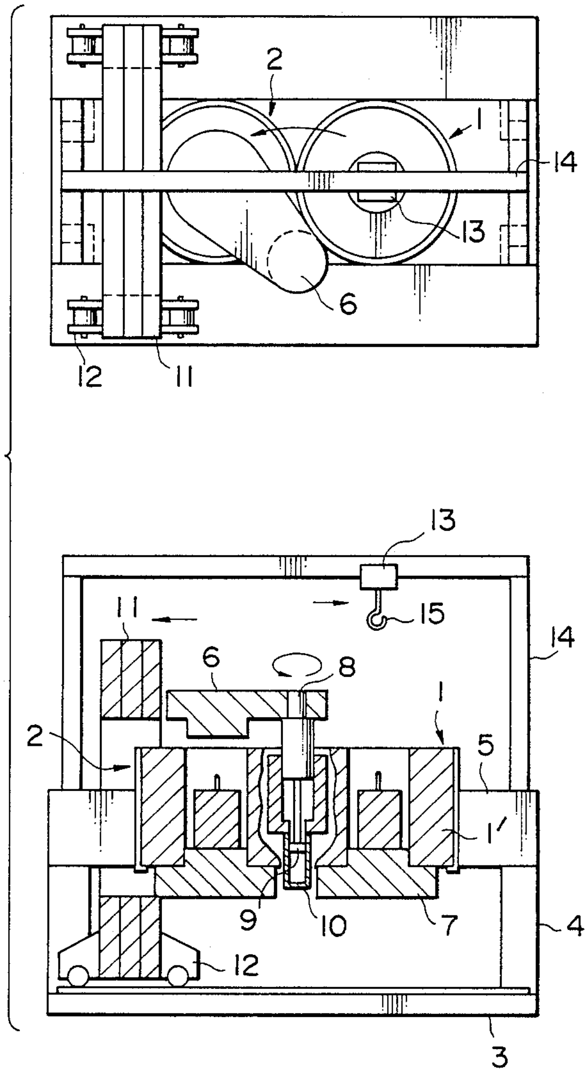

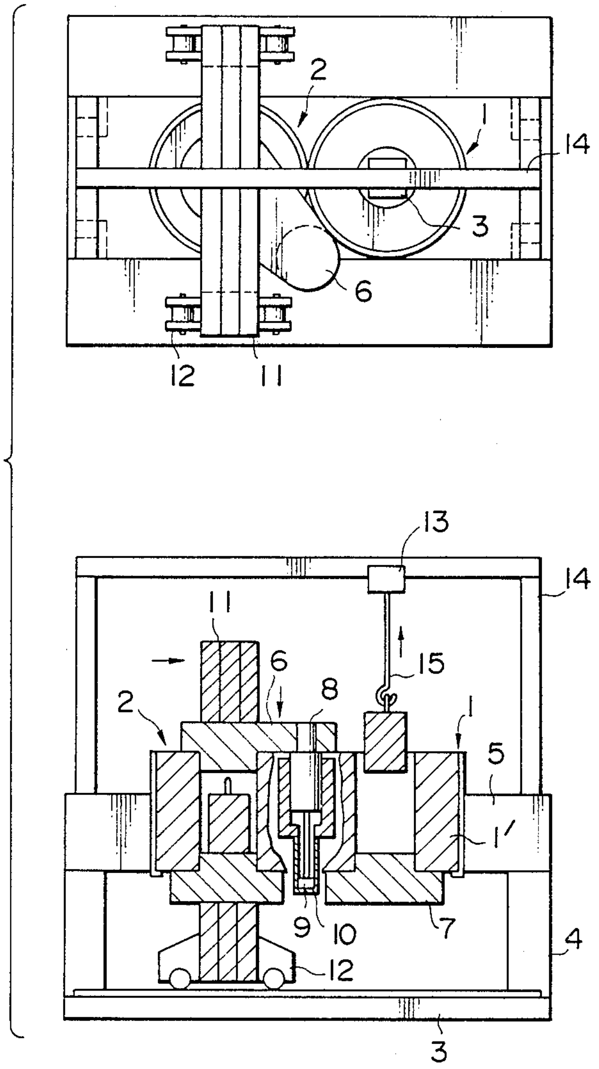
FIGURE 1(III)

FIGURE 2(III)
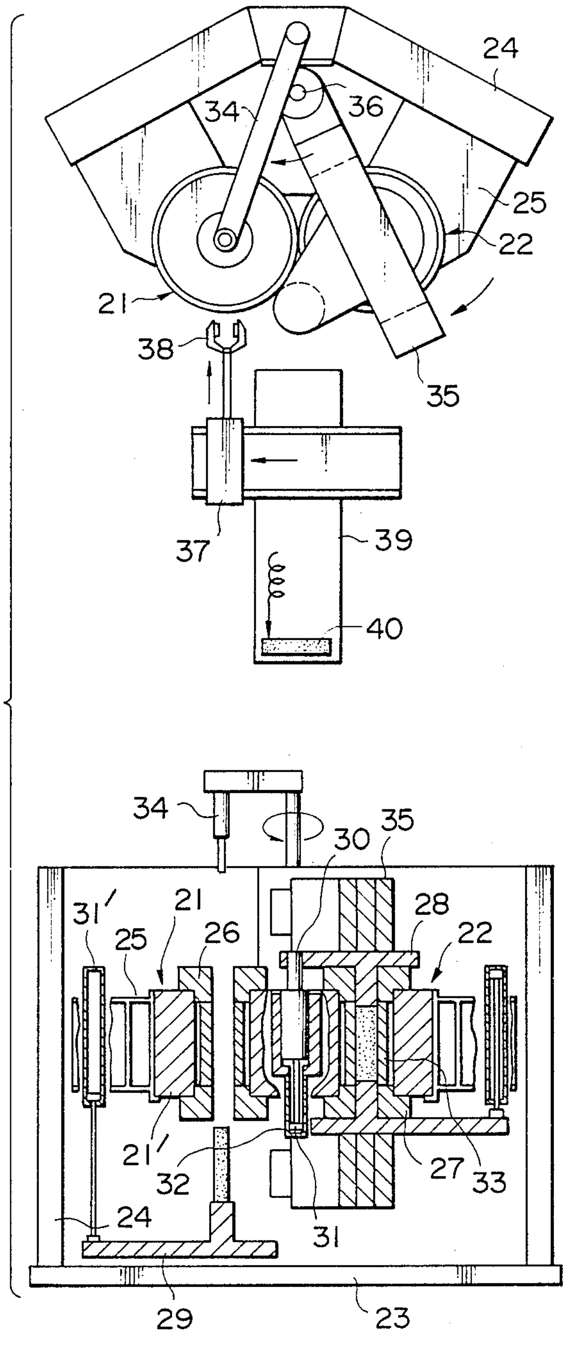

MULTIPLE-CONTAINER TYPE COLD ISOSTATIC PRESS

BACKGROUND OF THE INVENTION

1. Field of the Invention

This invention relates to a cold isostatic pressing works or material to shape in high pressure containers by application of hydrostatic pressure.

2. Description of the Prior Art

A conventional multiple-container type cold isostatic press is described, for example, in Japanese Patent Publication No. 54-41750.

As illustrated in FIG. 3, this prior art press has a couple of shaping containers 51 and 52 supported in symmetrical positions on a container frame 57 which has its center portion rotatably supported on one of a plurality of support columns 55 connecting a top platen 53 and a base block 54 of a press frame 56. The container frame 57 is provided with a gear 58 in a lower portion of its outer periphery and is rotatable about the support column 55 by means of a drive mechanism including a motor 60 and a pinion which is meshed with the gear 58 so as to move the containers alternately into a position at an operational center X—X at the center of the press frame 56 and a position at an adjacent service center Y—Y thereby to enhance production efficiency.

The above-described conventional press of the movable type, which is designed to move the containers into and out of the press frame together with ultra-high pressure pipings appendant to the containers, is unsatisfactory in terms of safety and durability as a high production machine. In addition, the shaping containers are supported in the fashion of a cantilever by a container frame which is rotatably mounted at its center on one of the support columns of the press frame, so that the containers lack rigidity and therefore are apt to cause misalignments of the axes of the containers and the press frame, particularly in a case where shaping containers of larger sizes and weights are employed, giving rise to problems when setting the shaping containers in the press frame.

SUMMARY OF THE INVENTION

Accordingly, it is an object of the present invention to provide a multiple-container type cold isostatic press which is improved in terms of the safety and durability of the ultrahigh pressure pipings which are associated with the shaping containers, supporting the shaping containers with appropriate rigidity to constantly stabilize the alignment of the axis of a container with the axis of the press frame.

In accordance with the present invention, the above-mentioned objects are achieved by the provision of a cold hydrostatic press of the type including a plurality of shaping containers movable relative to a common press frame and each provided with one or more plugs or closure means, and adapted to perform concurrently at different positions an operation of loading or unloading a work or shaping material from one container and an operation of pressing a work in another container, the cold hydrostatic press being characterized in that a plurality of stationary shaping containers are mounted on a fixed container frame with the axes of the respective containers in parallel relation with each other.

The above and other objects, features and advantages of the invention will become apparent from the following description and the appended claims, taken in conjunction with the accompanying drawings which show by way of example preferred embodiment of the invention.

BRIEF DESCRIPTION OF THE DRAWINGS

In the accompanying drawings:

FIGS. 1(I) to 1(III) are schemtic plan views and vertically sectioned front views showing a cold hydrostatic press embodying the present invention in different stages of operation;

DESCRIPTION OF THE PREFERRED EMBODIMENTS

Hereafter, the invention is described more particularly by way of a couple of preferred embodiments.

First Embodiment

Figure 1I:
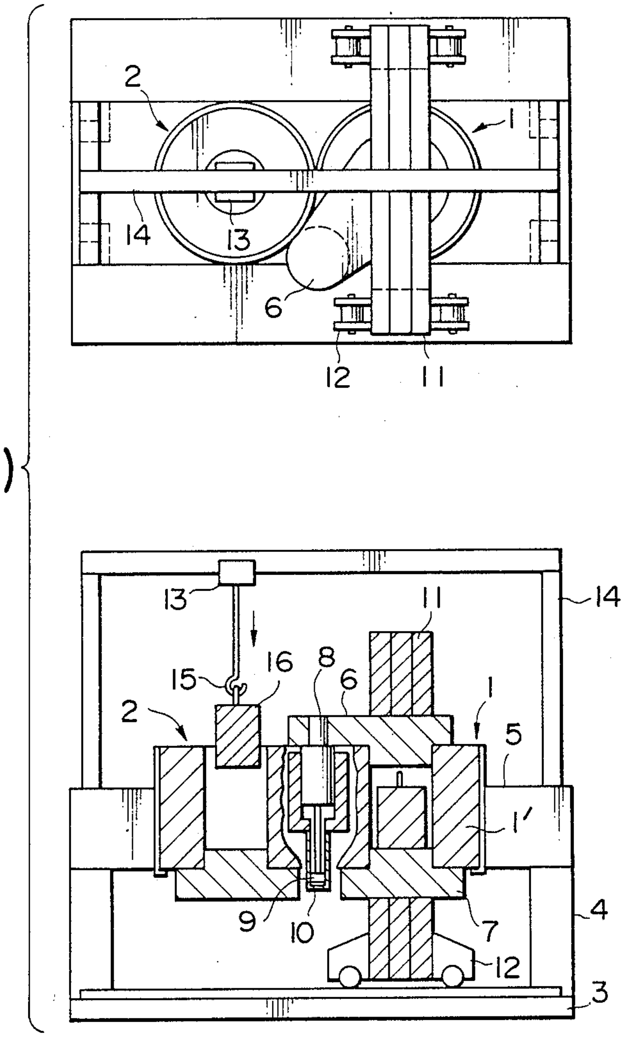

Referring to FIGS. 1(I) to 1(III), there is shown a wet type cold isostatic press, in which indicated at 1 is a first shaping container and at 2 a second shaping container. The first and second shaping containers 1 and 2 of cylindrical shape are fixed to each other at contacting circumferential wall portions with the respective axes disposed parallel with each other. The first and second shaping containers 1 and 2 are supported by a container frame 5 which has opposite ends thereof secured to and fixely supported on upper ends of a pair of base frames 4 erected at the opposite ends of a base 3.

Each of the first and second shaping containers 1 and 2 is constituted by a cylindrical container body 1' which is open at the upper and lower ends thereof, and upper and lower plugs 6 and 7 detachably fitted in the openings at the upper and lower ends of the container body. The upper plug 6 is used commonly for both of the first and second containers 1 and 2 and turnable about a swivel shaft 8, which is disposed parallel with the axes of the first and second shaping containers 1 and 2, for movement between the two containers. An upper plug lifter including a cylinder 9 or the like is mounted in contact with the circumferential walls of the first and second containers 1 and 2 to lift up and down the upper plug 6 in the axial direction of the swivel shaft 8.

Indicated at 11 is a press frame of a gate-like shape the lower ends of which are mounted on wheeled carriages 12 to move the press frame reciprocally between the first and second shaping containers 1 and 2 for supporting the same.

Reference numeral 13 denotes a hoist which is suspendedly supported on a ceiling frame 14, which is in turn supported at opposite ends on the container frame 5, for reciprocal movements between the first and second shaping containers 1 and 2. The hoist 13 is provided with a hook 15 which is capable of releasably catching an unshaped work piece or a shaped product and is movable up and down in the vertical direction.

Operation of the above-described first embodiment is as follows.

FIG. 1(I) shows a stage of operation where the first shaping container 1 having the upper and lower ends of its container body 1' closed with the upper and lower plugs 6 and 7 supported by the press frame to undergo the pressure-forming operation. On the other hand, the second shaping container 2 has the upper end of its container body 1' opened although the lower end is still closed with the lower plug 7, to charge thereinto a work piece 16 by the hoist 13 as indicated by an arrow.

FIG. 1(II) shows a stage after completion of the press-forming by the first shaping container 1, in which the press frame 11 is moved by the wheeled carriages 12 to the position of FIG. 1(II) as indicated by an arrow, and then the upper plug 6 closing the upper end of the container body 1' of the first shaping container 1 is lifted up and turned by the upper plug lifter 10 for shifting to a position immediately above the opening at the upper end of the second shaping container 2. In the meantime, the hoist 13 is moved to a position above the opening at the upper end of the first shaping container.

In the stage shown in FIG. 1(III), after lowering the upper plug 6, the press frame 11 is shifted to the position for the second shaping container 2 to support its container body 1' as well as its upper and lower plugs 6 and 7 in preparation for the next press-forming, while the shaped work is ejected from the first shaping container 1 by the hoist 13. Thereafter, the state of FIG. 1(I) is resumed to repeat a similar cycle of the pressure-forming operation.

Second Embodiment

Figure 2I:
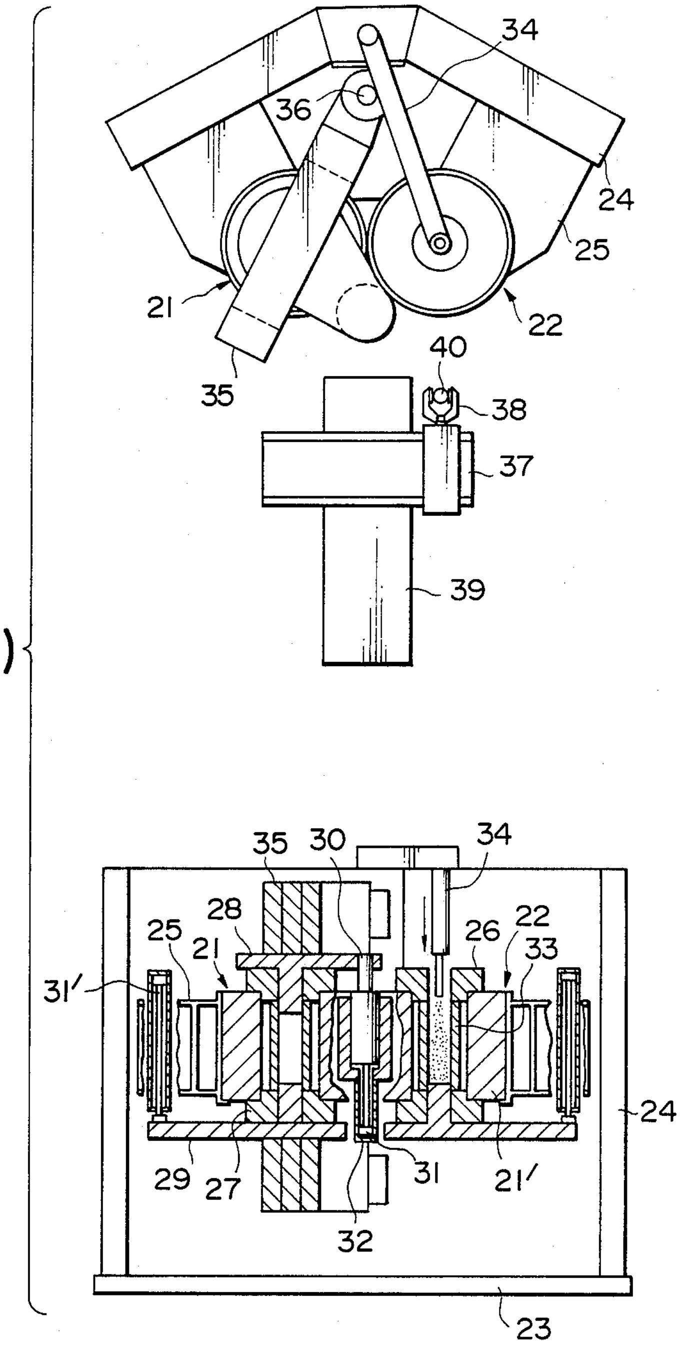
FIGS. 2(I) to 2(II) are views similar to FIGS. 1(I) to 1(III) but showing another embodiment of the invention.
Figure 2:
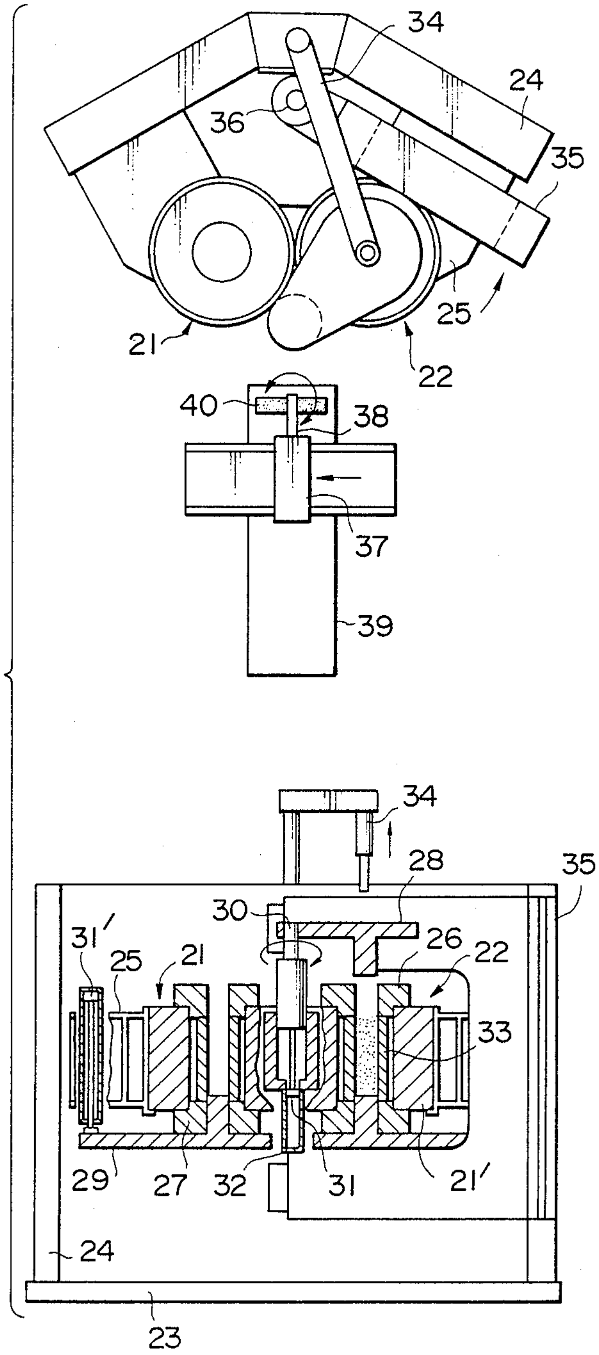
Figure 3:
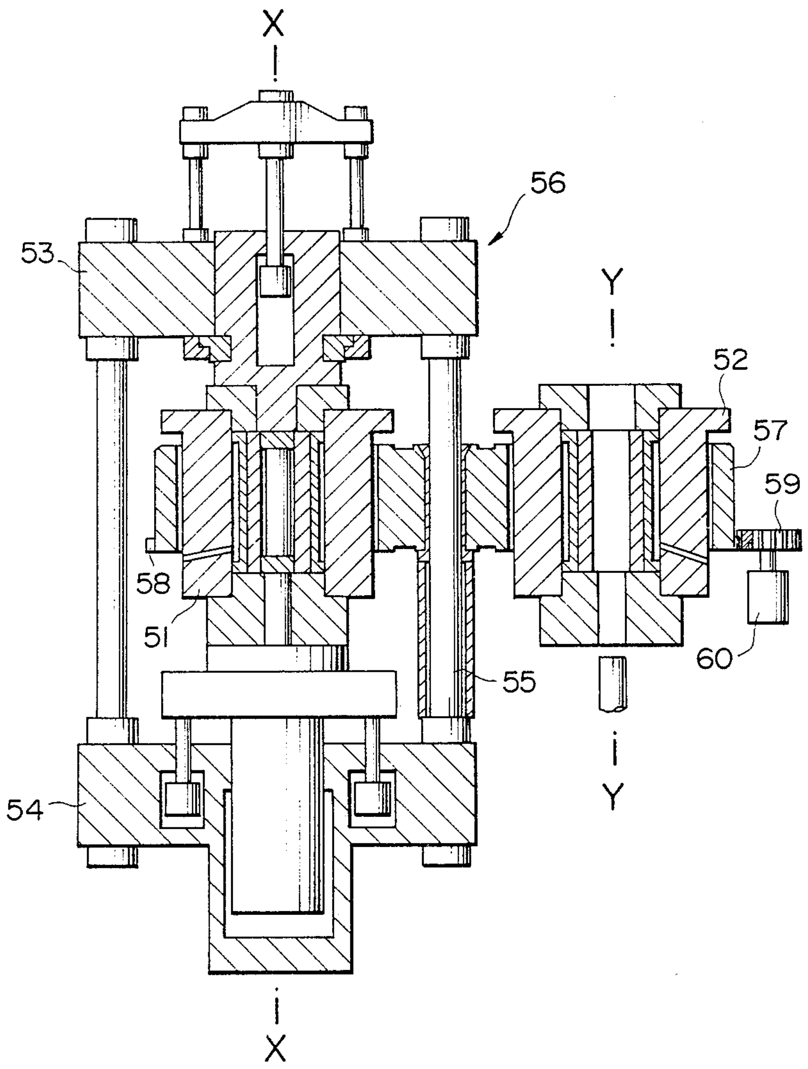
FIGURE 3 PRIOR ART
FIG. 3 is a vertically sectioned front view of a conventional counterpart.

FIGS. 2(I) to 2(III) show a dry type cold hydrostatic press according to the present invention, in which indicated at 21 is a first shaping container and at 22 a second shaping container. These first and second shaping containers 21 and 22 are fixed to each other at contacting circumferential wall portions with the respective axes parallel with each other, and supported at the opposite ends on a base frame 24 of an angular shape in plan view which is erected on a base 23 parallel with the axes of the first and second shaping containers 21 and 22, through a pair of container frames 25 which are secured to opposite ends of the base frame 24.

Each of the first and second shaping containers 21 and 22 is constituted by a container body 21' which is open at the upper and lower ends thereof, upper and lower plug rings 26 and 27 detachably fitted in the upper and lower openings of the container body 21', and upper and lower plugs 28 and 29 detachably engageable with the upper and lower plug rings. The upper plug 28 is used commonly for both of the first and second shaping containers 21 and 22, and rotatable about a swivel shaft 30, which is disposed parallel with the axes of the first and second shaping containers 21 and 22, for movement between the two containers. For this purpose, an upper plug lifter 32 including a cylinder 31 which is movable in the axial direction of the swivel shaft is mounted in contact with the circumferences of the first and second shaping containers. The lower plug 29 is movable up and down in the axial direction by means of cylinder 31', which is fixedly mounted on the container frame in parallel relation with the axes of the first and second shaping containers 21 and 22, and disengageable from the container 21 or 22. The powdery material to be formed in the shaping container through a pressure-forming rubber die 33 is charged into a chamber in the container by a powder feeder 34 which is rotatable about a swivel shaft parallel with the axes of the containers 21 and 22 for movements between positions above the two containers, and which is also movable up and down in the axial direcation of the swivel shaft.

Designated at 35 is a press frame which is rotatable about a swivel shaft 36 parallel with the axes of the first and second containers for movements between positions for supporting the first and second shaping containers.

Reference numeral 37 denotes a handling robot which is reciprocally movable between the first and second shaping containers 21 and 22, and capable of gripping and releasing a shaped product 40. The robot has a rotary function and is provided with a chuck 38 which is movable toward and away from a shaped product 40 to catch and release it into a product stock chute 39 which is located beneath the handling robot at the center of the machine.

The above-described second embodiment operates in the following manner.

In the stage of FIG. 2(I), the first shaping container 21 has its container body 21' closed with the detachable upper and lower plugs 28 and 29 through the upper and lower plug rings 26 and is 27, and supported by the press frame through the upper and lower plugs 28 and 29 to undergo the pressure-forming operation. On the other hand, the second shaping container 22 has the upper end of its container body 21' opened and the lower end closed with the lower plug 29 through the lower plug ring 27, to receive of a charge of the powdery material on the inner side of the pressure-forming rubber die 33 from the powder feeder. The chuck 38 of the product handling robot 37 grips therein a product which was ejected in a preceding stage of operation.

In the stage of FIG. 2(II) immediately after completion of the press-forming by the first shaping container 21, the powder feeder 34 is moved up and the press frame 35 is turned to the position shown. Then, the upper plug is lifted up and turned by the upper plug lifter 32, and moved to a position above the upper open end of the second shaping container 22. Concurrently, the handling robot 37 moves to a median position between the first and second shaping containers, turning the chuck 38 through 90 degrees to release and drop the product 40 into the product stock chute 39.

FIG. 2(III) shows a stage where the upper plug 28 is lowered and the press frame 35 is turned to the position for the second shaping container 22 to support its upper and lower plugs in preparation for the next pressure-forming operation. On the other hand, the lower plug 29 of the first shaping container 21 is lowered together with a shaped product on the plug 29, while the robot 37 is moved toward the first shaping container 21, extending out its chuck 38 to grip the product 40 therein. In the meantime, the powder feeder 41 is turned to a position above the open upper end of the first shaping container to standby for the next operation. Next, the state of FIG. 2(I) is resumed for reparting similar cycles of the pressure-forming operation.

As is clear from the foregoing description, the multiple-container type cold hydrostatic press according to the invention employs stationary shaping containers which are fixed together with associated ultra-high pressure pipings, so that such has an advantage in that its safety and durability as an ultra-high pressure machine can be improved without impairing the merits of the prior art, namely, the economical merit resulting from the common use of the press frame, upper plug and product handling device for a plurality of shaping containers and the merit of the high production efficiency attained by performing the forming operation and the adjunct operations concurrently by a plurality of shaping containers in different positions.

Further, by the use of the stationary type shaping containers, it becomes possible to support them rigidly on opposite sides thereof and to preclude misalignments of the container axes at the time of the pressure-forming operation.

Obviously, numerous modifications and variations of the present invention are possible in light of the above teachings. It is therefore to be understood that within the scope of the appended claims, the invention may be practiced otherwise than as specifically described herein.

What is claimed is:

1. A cold isostatic press of a multiple container type comprising:

a base frame;

a press frame;

an upper plug pivotably mounted on said base frame and movable toward and away from a first and second shaping container and adapted to perform an operation of loading or unloading a shaping material from said first container and a pressure-forming operation in said second container concurrently at different positions; and a fixed container frame on which are mounted said first and second shaping containers.

2. The cold isostatic press of claim 1, wherein said fixed container frame is fixedly mounted on said base frame and further comprising a wheeled carriage on which said press frame is mounted for reciprocating movement to and from said first and second shaping containers.

3. The cold isostatic press of claim 1, wherein said base frame is of an angular shape in plan view and upon which said container frame is mounted.

* * * * *